(12) United States Patent
Pestritto

(10) Patent No.: US 9,908,578 B2
(45) Date of Patent: Mar. 6, 2018

(54) TRIKE WITH DRUM SET

(71) Applicant: Michael Pestritto, Pompano Beach, FL (US)

(72) Inventor: Michael Pestritto, Pompano Beach, FL (US)

( * ) Notice: Subject to any disclaimer, the term of this patent is extended or adjusted under 35 U.S.C. 154(b) by 8 days.

(21) Appl. No.: 15/238,418

(22) Filed: Aug. 16, 2016

(65) Prior Publication Data

US 2017/0050694 A1   Feb. 23, 2017

Related U.S. Application Data

(60) Provisional application No. 62/205,850, filed on Aug. 17, 2015.

(51) Int. Cl.
| | | |
|---|---|---|
| *B62J 11/00* | (2006.01) | |
| *G10D 13/00* | (2006.01) | |
| *B62K 5/027* | (2013.01) | |
| *B62K 19/40* | (2006.01) | |
| *B62K 21/12* | (2006.01) | |
| *B62K 21/18* | (2006.01) | |
| *B62D 49/06* | (2006.01) | |
| *B62D 1/22* | (2006.01) | |

(52) U.S. Cl.
CPC ............... *B62J 11/00* (2013.01); *B62K 5/027* (2013.01); *B62K 19/40* (2013.01); *B62K 21/12* (2013.01); *B62K 21/18* (2013.01); *G10D 13/00* (2013.01); *B62D 1/22* (2013.01); *B62D 49/0692* (2013.01)

(58) Field of Classification Search
CPC ........ B62D 49/0692; B62D 1/22; B62J 11/00; B62K 5/027; B62K 19/40; B62K 21/12; B62K 21/18; G10D 13/00
See application file for complete search history.

(56) References Cited

U.S. PATENT DOCUMENTS

| | | | | |
|---|---|---|---|---|
| 4,088,199 | A * | 5/1978 | Trautwein ............ | B60G 21/007 180/209 |
| RE32,031 | E * | 11/1985 | Winchell ............... | B62K 5/027 180/210 |
| 5,431,243 | A * | 7/1995 | Richards ................. | B60G 3/01 180/211 |
| 8,513,510 | B1 * | 8/2013 | Huang ................... | G10G 5/005 84/421 |
| 2010/0213731 | A1* | 8/2010 | Benden ................... | A61G 1/01 296/19 |
| 2013/0074676 | A1* | 3/2013 | Waitzman, III ........ | G10D 13/00 84/421 |

* cited by examiner

*Primary Examiner* — Tony H Winner
*Assistant Examiner* — Marlon A Arce
(74) *Attorney, Agent, or Firm* — Tucker Law, P.A.; Matthew Sean Tucker, Esq.

(57) ABSTRACT

A motorcycle with an integrated drum set positioned about the trike, the motorcycle having a rear-steering assemblage for allowing the integrated drum set to be played by a forward rider.

10 Claims, 6 Drawing Sheets

TRIKE WITH DRUM SET

CROSS-REFERENCE TO RELATED APPLICATION

This application is related to and claims benefit to U.S. Provisional Patent Application Ser. No. 62/205,850, filed Aug. 17, 2015, entitled TRIKE WITH DRUM SET, the entirety of which is incorporated herein by reference.

FIELD OF THE INVENTION

The present invention relates to motorcycle, and more particularly to a motorcycle trike with an integrated drum set.

BACKGROUND OF THE INVENTION

Motorcycles have been used for a long period of time. Due to the fact that the steering is configured for the front most driver, it was not previously possible to integrate other activities with the motorcycle. Typically, such motorcycles are built as a two wheeled motorcycle or three wheeled motorcycle tricycle.

While a select few innovations for a motorcycle with a drum set generally exists, those prior art innovations differ from the present invention. For example, prior art motorcycles appear to integrate a drum set as a side car. Thus, no known prior art includes a two wheeled motorcycle and/or a three wheeled motorcycle tricycle with a centrally integrated drum set.

The uncovered prior art is side heavy due to the placement of the drum set as a sidecar, which reduces the drivability of the existing motorcycles and prevents consistent turning.

There is a need in the art for a motorcycle tricycle that includes an integrated drum set and allows for the drummer to be positioned central about the motorcycle tricycle.

SUMMARY OF THE INVENTION

The present invention advantageously provides a motorcycle tricycle with an integrated drum set.

According to an embodiment of the present invention, a principal object is to provide two or three wheeled motorcycle ("motorcycle") with an integrated drum set positioned on both sides of the motorcycle thereof.

According to an embodiment of the present invention, another object is to provide a drum set that is mirrored on both sides of the motorcycle.

According to an embodiment of the present invention, another object is to provide a motorcycle with a rear steering mechanism. Also, the rear steering allows for a person to play the drum set during operation of the motorcycle.

Other objects will become evident as the present invention is described in detail below.

BRIEF DESCRIPTION OF THE DRAWINGS

Embodiments of the present application are described herein in which similar elements are given similar reference characters, and a more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
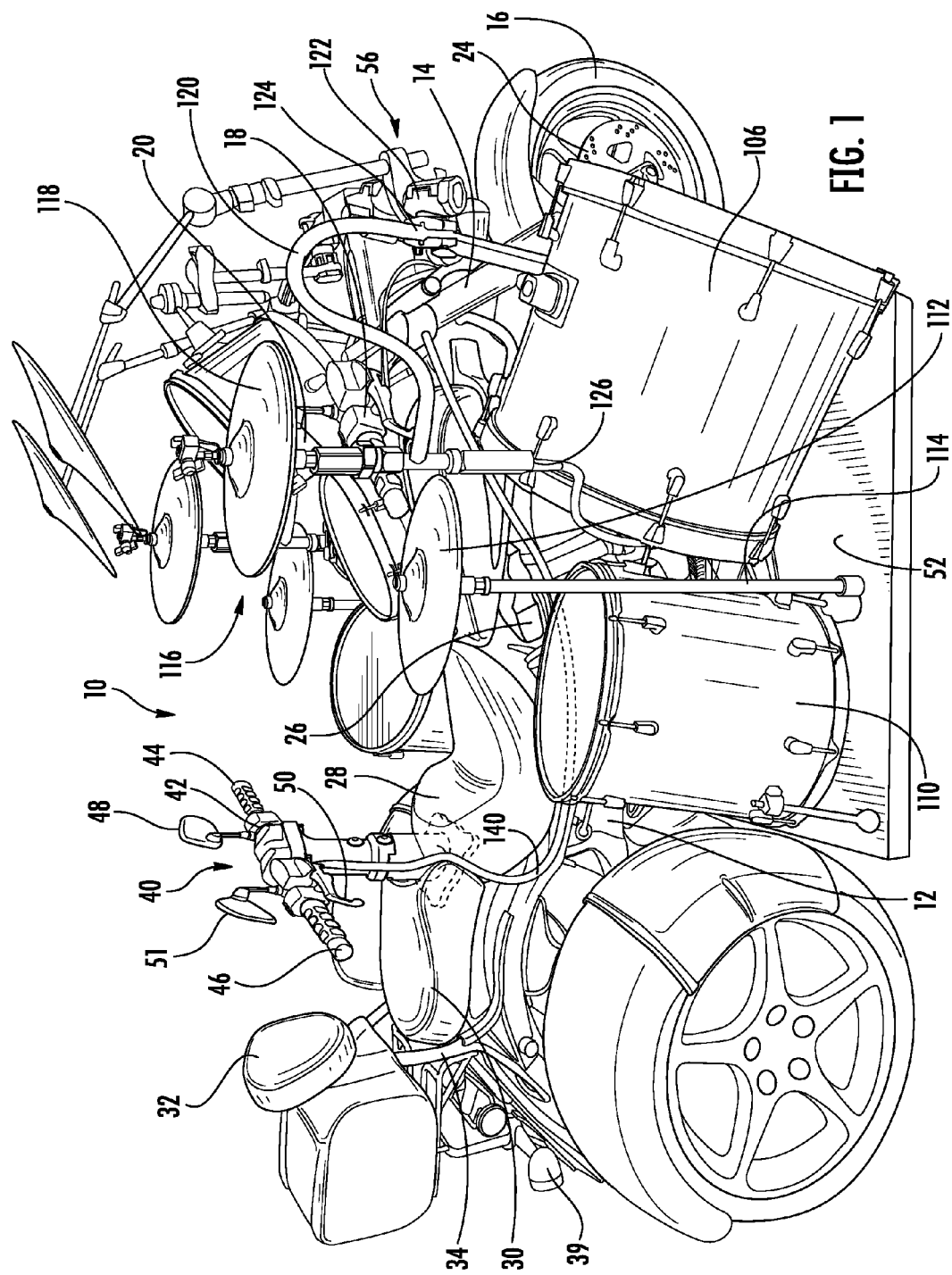
FIG. 1 is a right side perspective view of one embodiment of the motorcycle tricycle with an integrated drum set in accordance with the principles of the present invention.

The present invention advantageously provides a motorcycle tricycle with an integrated drum set. The present invention contemplates various types of motorcycles with a centrally mounted drum set.

Accordingly, the present invention components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawings figures in which like reference designators refer to like elements. FIG. 1 shows an exemplary motorcycle tricycle (hereafter "trike") with an integrated drum set constructed in accordance with the principles of the present invention and designated generally as trike "10." In particular, trike 10 includes a three wheel trike frame body 12. The body 12 includes a front trike suspension 14 and a rear trike suspension 36. The front trike suspension 14 carries a steerable front wheel 16.

Other various conventional motorcycle components are included; for example, a front steering mechanism 18, mirrors 20, fuel tank 22; brakes 24; exhaust 38; brake lights 39. The front steering mechanism 18 includes without limitation handle bars, throttle control, and brake levers for initiating tire braking. The instant invention further includes a conventional engine 26 for propelling the trike 10 forward.

A front seat 28 and a rear seat 30 are provided centrally mounted in an inline configuration. The rear seat 30 includes a back rest 32. The back rest 32 is supported via a back rest support member 34.

A rear steering mechanism 40 is provided that controls the position of the steerable front wheel 16. The nonconventional rear steering mechanism 40 includes rear handlebar 42 having dual handgrips 44, 46 for gripping. The handgrips 44, 46 includes padding 51 disposed over at least a portion of the handgrips 44, 46 for the comfort of the rider. One or more rear positioned rear view mirrors 48 coupled with the rear handlebar 42. One or more brake levers 50 are coupled with the handlebar 42 for engaging one or more front brakes 24 and/or rear brakes (not shown) when pressure is applied by the rider to the brake levers 50.

In one embodiment, the rear steering mechanism 40 is hydraulically driven and/or otherwise coupled to the front trike suspension 14 for controlling the front wheel 16. One or more hydraulic cables 140 secured between the rear steering mechanism 40 and the front trike suspension 14 for turning the front wheel 16. In yet another embodiment, the rear steering mechanism 40 can be used independently of the conventional front handle bars. In one non-limiting embodiment, a switch (not shown) can be adjusted to switch the control of the front wheel 16 between the front steering mechanism 18 and the rear steering mechanism 40.

A right side platform 52 (see FIG. 1) and a left side platform 54 (see FIG. 2) are mounted to the frame body 12. The right and left side platforms 52, 54 should be mounted at a height above the ground to provide the necessary clearance to safely ride the trike on roadways.

Figure 3:
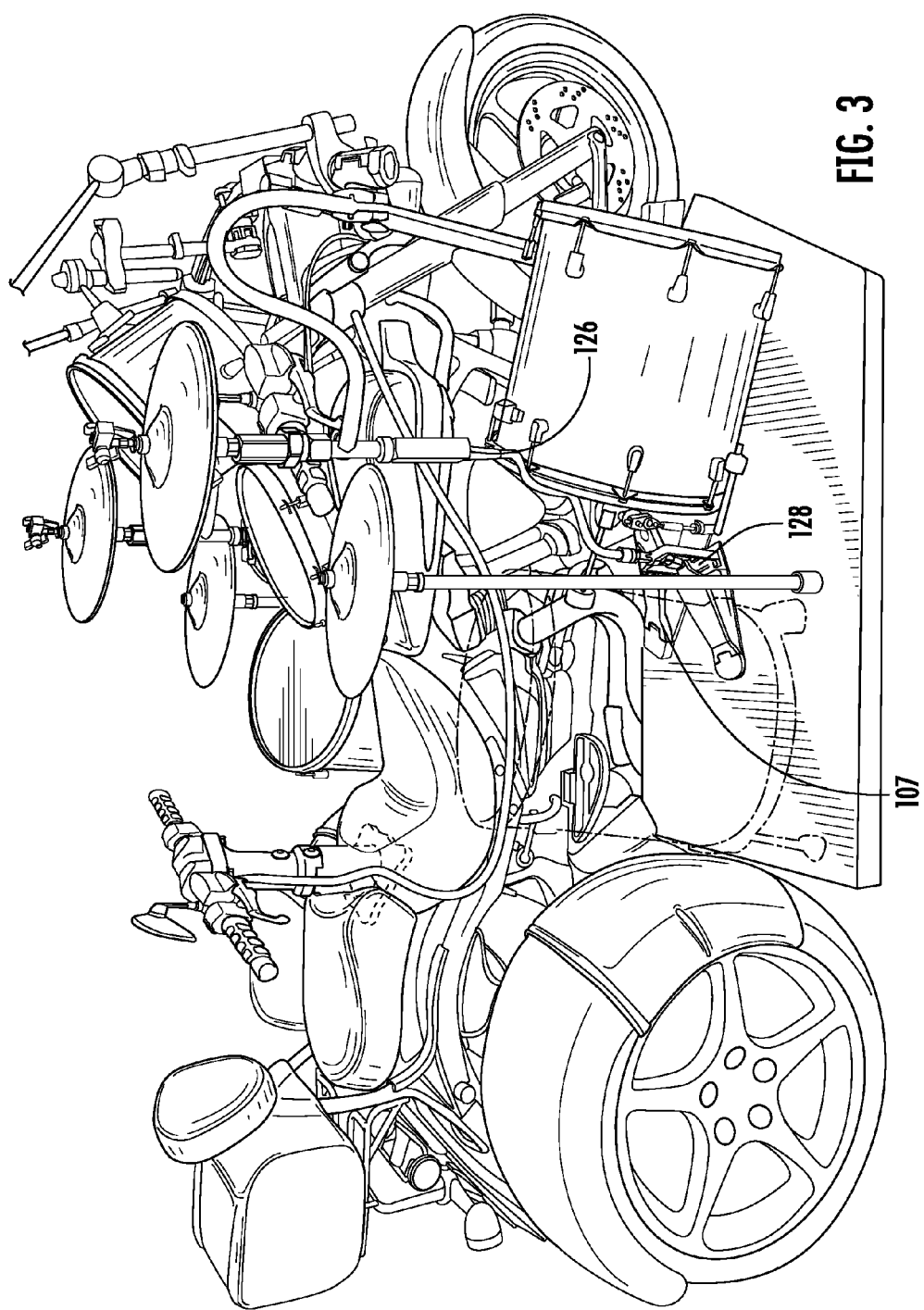
FIG. 3 is a right side perspective view of the motorcycle tricycle with a view through one floor tom in accordance with the principles of the present embodiment.
Figure 4:
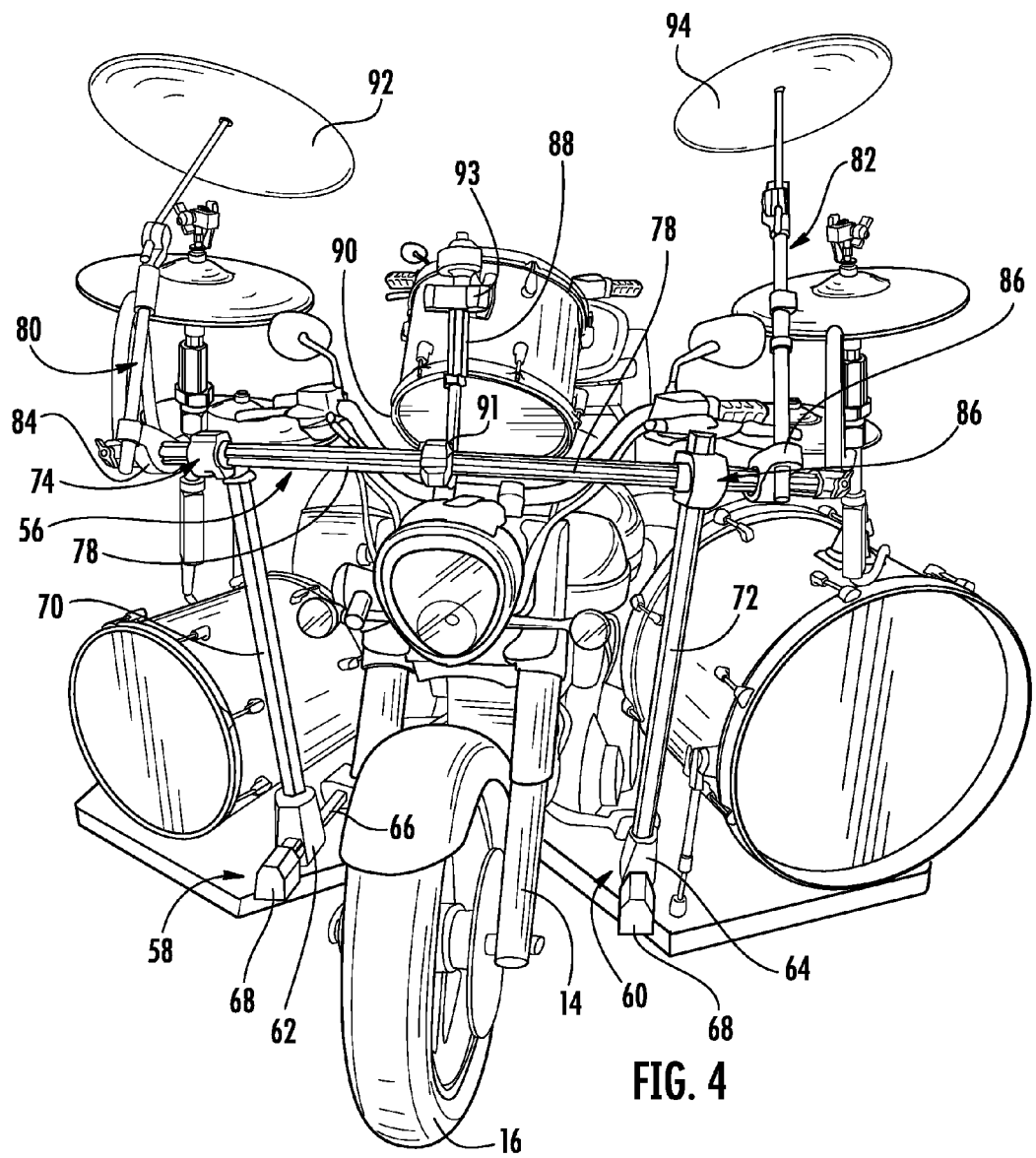
FIG. 4 is a front perspective view of the motorcycle tricycle with an integrated drum set in accordance with the principles of the present embodiment.
Figure 5:
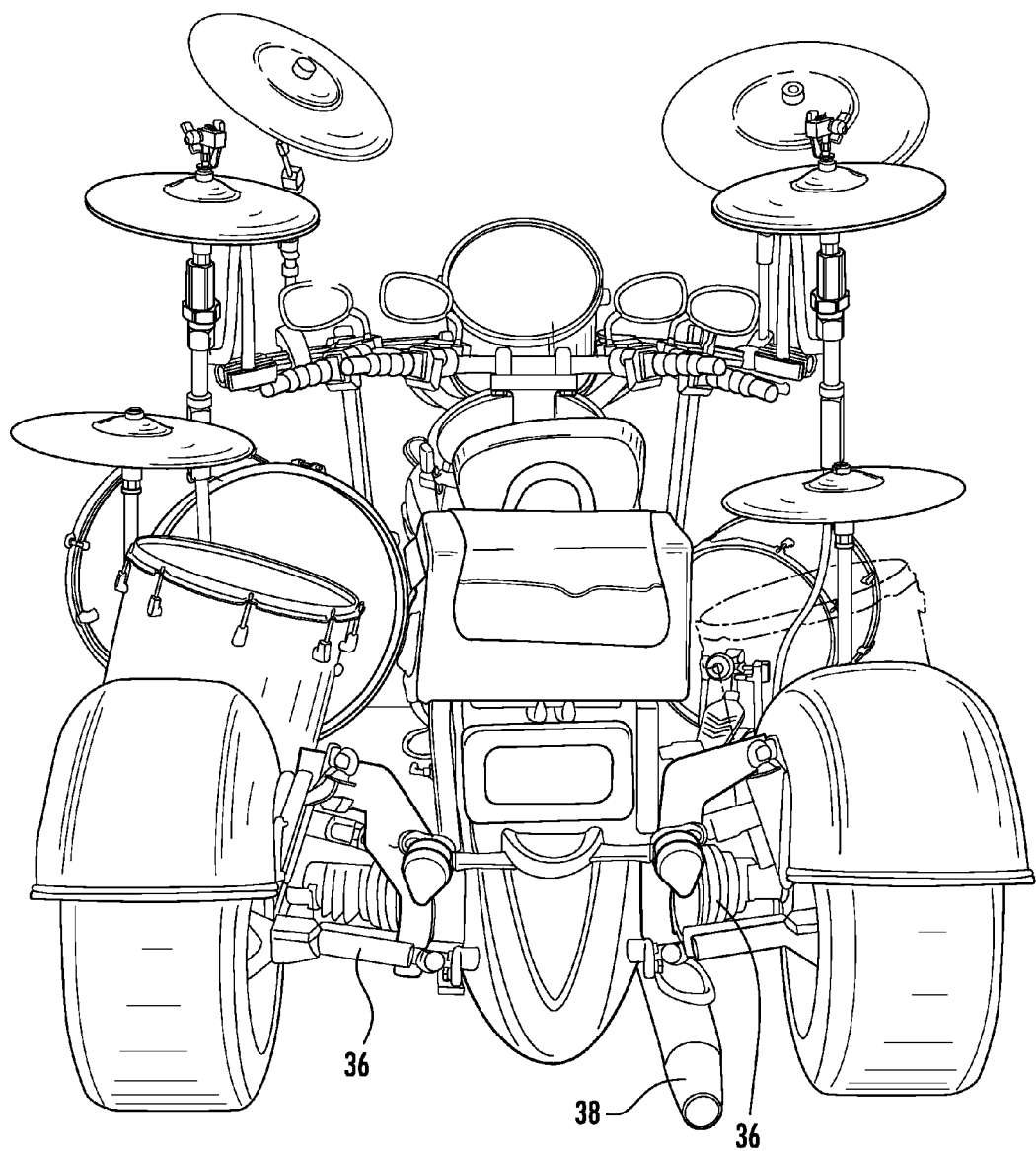
FIG. 5 is a rear perspective view of the motorcycle tricycle with an integrated drum set in accordance with the principles of the present embodiment.

As illustrated in FIG. 4, a drum rack assembly 56 is mounted on the right and left side platforms 52, 54. The drum rack assembly includes a right t-leg assembly 58 that is mounted with the right side platform 52 and a left t-leg assembly 60 that is mounted with the left side platform 54. Each of the right and left t-leg assemblies 58, 60 include a t-leg clamp 62, 64. The t-leg assemblies 58, 60 each include horizontal leg sections 66 and a plurality of feet 68 for stabilization. A right leg 70 and a left leg 72, each having a first and second end, engage the t-leg assemblies 58, 60 respectively at one end thereof, as illustrated in FIG. 3. The right and left legs each engage horizontal clamp assemblies 74, 76 on their opposite ends.

A horizontal upper bar 78 is configured to maintain a number of boom arms or other members thereof. The horizontal upper bar 78 is provided as a straight bar, however, a curved bar may be implemented without departing from the spirit and scope of the instant invention. The horizontal upper bar 78 is positioned forward from the handlebars to prevent interference during turning, as illustrated in FIG. 1. A right cymbal boom assembly 80 and a left cymbal boom assembly 82 is coupled on their first end to the horizontal upper bar 78 via a cymbal boom clamp assembly 84, 86. The cymbal boom clamp assemblies 84, 86 prevent the cymbal boom assemblies 80, 82 from sliding about the horizontal upper bar when clampedly engaged. The right and left cymbal boom assemblies 80, 82 are coupled with a cymbal on their opposite ends, 92, 94. While the instant invention shows only one cymbal 92, 94 coupled with the right and left cymbal boom assemblies, additional crash cymbals, or other types of cymbals, may be coupled with the cymbal boom assemblies 80, 82 such that two or more cymbals are secured to each cymbal boom assembly 80, 82.

A drum boom 88 is coupled to the horizontal upper bar 78 via a drum boom clamp assembly 90 on a first portion 91 and coupled to a drum 144 on a second portion 93. Other arms and booms may be secured to the drum rack assembly 56 as desired or required. The horizontal upper bar 78 is fluted, dovetailed or otherwise constructed to prevent the boom assemblies 84, 86, 90 from spinning but still allow the boom assemblies 84, 86, 90 to slide freely when any of the clamp assemblies 84, 86, 90 are in an unlocked position thereof.

Figure 2:
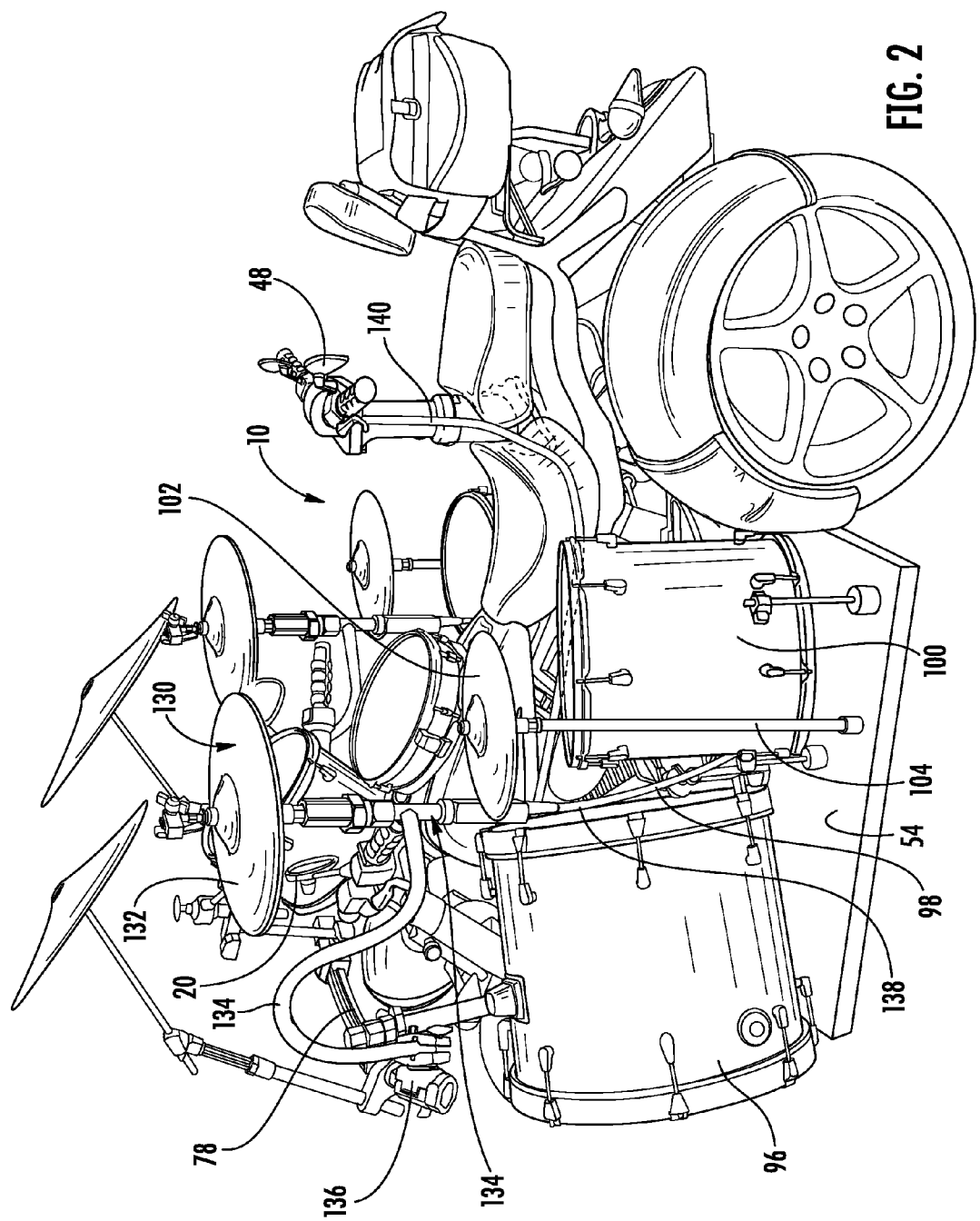
FIG. 2 is a left side perspective view of the motorcycle tricycle with an integrated drum set in accordance with the principles of the present embodiment.

Referring now to FIG. 2, a detailed left side view of the trike 10 is shown. A base drum 96 with an accompanying foot pedal 98 (see FIG. 3 for a same or similar foot pedal 107) is mounted to the left side platform 54. The base drum 96 coupled with a bass drum pedal 98 as would be conventionally understood and operated (See FIG. 6). A floor tom 100 is mounted to the left side platform 54. A floor cymbal 102 is mounted to the left side platform 54 via a floor mount 104.

Referring again to FIG. 1, a base drum 106 is mounted to the right side platform 52. The base drum 106 coupled with a bass drum pedal 108 as would be conventionally understood and operated (see FIG. 6). A floor tom 110 is mounted to the right side platform 52. A floor cymbal 112 is mounted to the right side platform 52 via a floor mount 114. A hi-hat cymbal assembly 116 is coupled with the horizontal upper bar 78. The hi-hat cymbal assembly 116 includes hi-hat cymbals 118 and a hi-hat arm 120. In one embodiment, the hi-hat arm 120 is coupled via a clamp assembly 122 on an end 124 to the horizontal upper bar 78. The hi-hat assembly 116 includes a portion 126 that connects with a hi-hat foot pedal assembly 128 for controlling the distance between the hi-hat cymbals 118.

Referring again to FIG. 2, a hi-hat cymbal assembly 130 is coupled with the horizontal upper bar 78. The hi-hat cymbal assembly 130 includes hi-hat cymbals 132 and a hi-hat arm 134. In one embodiment, the hi-hat arm 134 is coupled via a clamp assembly 136 on an end 124 to the horizontal upper bar 78. The hi-hat assembly 130 includes a portion 138 that connects with a hi-hat foot pedal assembly (not shown but the same or similar to the foot pedal assembly 128 shown in FIG. 3) for controlling the distance between the hi-hat cymbals 132.

Figure 6:
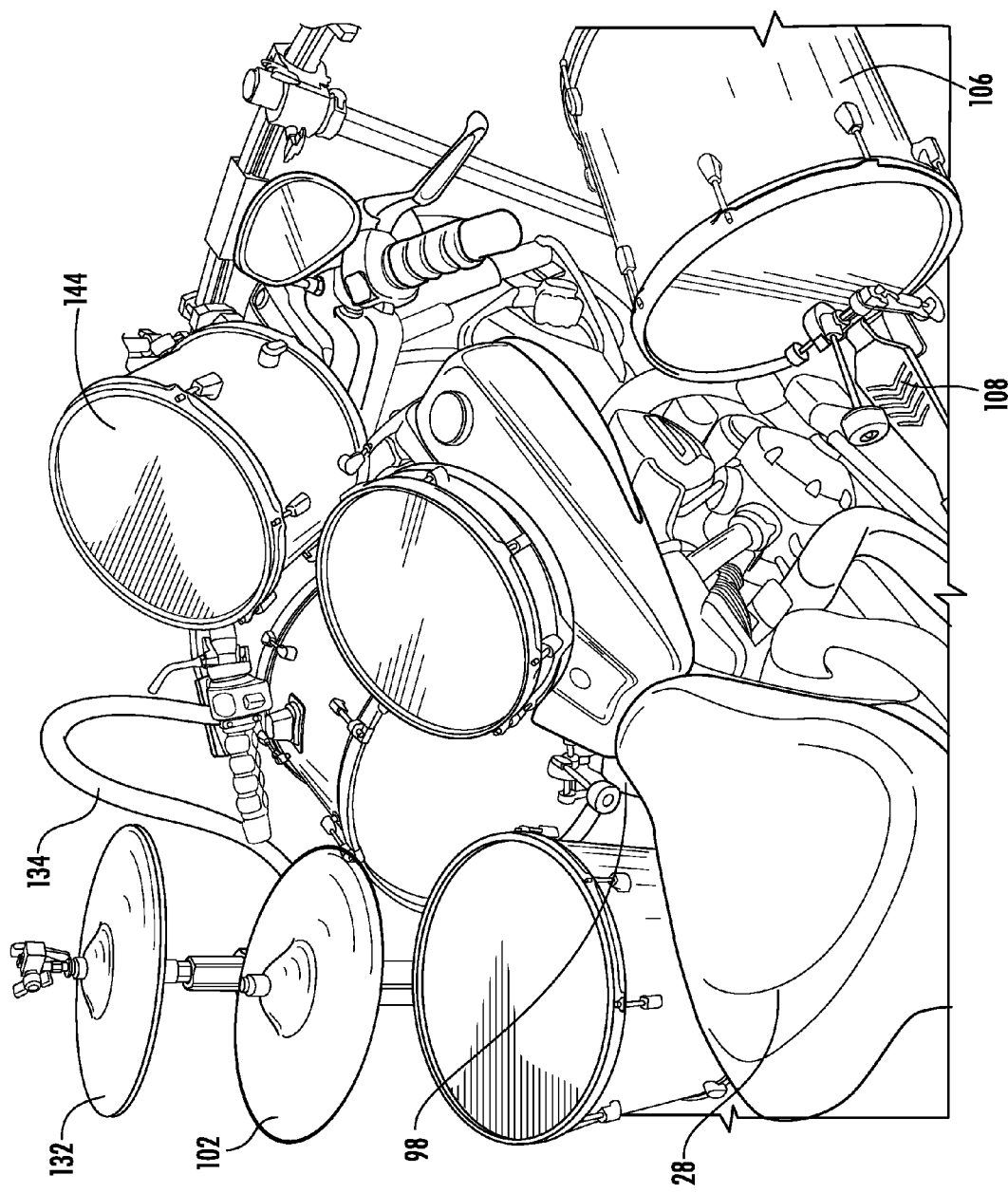
FIG. 6 is a partial perspective view of a front seat of the motorcycle tricycle with a partial view of the integrated drum set in accordance with the principles of the present embodiment.

Referring now to FIG. 6, a partial perspective view of the front seat of the motorcycle tricycle is shown. A snare drum or other drum 142 is mounted centrally about the trike 10 on or above the gas tank.

In one embodiment, the drums installed on the motorcycle are mirrored in all aspects, including size and shape, between the right and left sides of the motorcycle tricycle.

As used herein, when the term "and/or" is used, it shall include all combinations of one or more of the associated described items.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are contemplated in light of the above teachings without departing from the scope and spirit of the invention. It will be readily apparent that various changes may be made thereto without departing from the spirit and scope of the disclosure or sacrificing all of its material advantages. The examples and embodiments described herein are merely exemplary of the instant disclosure.

What is claimed is:

1. An at least two wheeled motorcycle comprising:
   a motorcycle frame;
   a front seat and a rear seat centrally mounted inline about said motorcycle frame;
   a drum set mounted in a playable distance on each side of said front seat; and
   a rear steering mechanism having a rear handlebar positioned behind said front seat, said rear steering mechanism capable of controlling a front wheel.

2. The at least two wheeled motorcycle of claim 1 further comprising at least one rear positioned rear view mirrors disposed about said rear handlebar.

3. The at least two wheeled motorcycle of claim 1, further comprising a front wheel coupled with a forward suspension disposed about said motorcycle frame, wherein said rear steering mechanism is hydraulically coupling said front wheel.

4. The at least two wheeled motorcycle of claim 1, further comprising a front handle bar capable of controlling a front wheel controllable independent of said rear handlebar.

5. The at least two wheeled motorcycle of claim 3 further comprising at least one hydraulic cable interposed between said forward suspension and said rear handlebar.

6. The at least two wheeled motorcycle of claim 4 further comprising an adjustable control for switching control of steering between a front handle bar disposed about said motorcycle frame and said rear handlebar.

7. The at least two wheeled motorcycle of claim 1 wherein said at least two wheeled motorcycle is a trike having a centrally mounted front wheel and two laterally displaced rear wheels.

8. The at least two wheeled motorcycle of claim 7 further comprising a left and right platform on a left and right side of said motorcycle frame.

9. The at least two wheeled motorcycle of claim 8, wherein said drum set is mounted about each said right and left platform.

10. An at least two wheeled motorcycle comprising:
a motorcycle frame;
a front steering column with a front wheel and a front handle bar for steering, said front steering column rotatably secured about said frame;
a front seat and a rear seat centrally mounted inline about said motorcycle frame, said rear seat including a back rest;
a drum set mounted in a playable distance on each side of said motorcycle frame; and
a rear steering mechanism having a rear handlebar positioned behind said front seat, said rear steering mechanism capable of controlling a front wheel independent of said front handle bar.

* * * * *